US007594453B2

(12) United States Patent
Blach

(10) Patent No.: US 7,594,453 B2
(45) Date of Patent: Sep. 29, 2009

(54) GEAR SYSTEM FOR DRIVE OF A MULTI-SHAFT EXTRUDER

(76) Inventor: Josef A. Blach, Hoher Steg 10, 74348 Lauffen (DE)

( * ) Notice: Subject to any disclaimer, the term of this patent is extended or adjusted under 35 U.S.C. 154(b) by 423 days.

(21) Appl. No.: 10/551,912

(22) PCT Filed: Feb. 27, 2004

(86) PCT No.: PCT/EP2004/001965

§ 371 (c)(1),
(2), (4) Date: Sep. 14, 2006

(87) PCT Pub. No.: WO2004/087398

PCT Pub. Date: Oct. 14, 2004

(65) Prior Publication Data

US 2007/0163371 A1 Jul. 19, 2007

(30) Foreign Application Priority Data

Apr. 3, 2003 (DE) ................................ 103 15 200

(51) Int. Cl.
*F16H 37/06* (2006.01)

(52) U.S. Cl. ................................ 74/665 N; 74/665 GA

(58) Field of Classification Search ................ 74/665 F, 74/665 G, 665 GA, 665 GB, 665 GC, 665 GD, 74/665 DE See application file for complete search history.

(56) References Cited

U.S. PATENT DOCUMENTS

| | | | | |
|---|---|---|---|---|
| 2,754,542 | A | | 7/1956 | Henning et al. |
| 3,824,875 | A | * | 7/1974 | Willert et al. .......... 74/665 GA |
| 4,586,219 | A | * | 5/1986 | Blach et al. .................. 24/410 |
| 5,108,711 | A | * | 4/1992 | Chszaniecki ................ 422/135 |
| 5,510,073 | A | | 4/1996 | Kaegi et al. |

FOREIGN PATENT DOCUMENTS

| | | |
|---|---|---|
| DE | 198 15 695 A1 | 10/1999 |
| EP | 0 788 867 B1 | 7/1999 |

OTHER PUBLICATIONS

European Search Report dated Aug. 5, 2004.

* cited by examiner

*Primary Examiner*—Ha D. Ho
(74) *Attorney, Agent, or Firm*—Flynn, Thiel, Boutell & Tanis, P.C.

(57) ABSTRACT

To drive an extruder which has several axially parallel shafts rotating in the same direction, with conveyor elements, arranged around a circle at equal angles with respect to each other, the shafts are attached to the driven shafts of a gear system. Each driven shaft has a pinion, and each driven pinion engages both with an externally-toothed drive wheel and with an internally-toothed hollow gear wheel. The externally-toothed drive wheel and the internally-toothed hollow gear wheel are driven with the same torque.

8 Claims, 3 Drawing Sheets

1
2a
2b
4
3

II
2a
4
4
2b
3
3
3
3
5
II
2a
1
6

7
5
8
9
11
12
13
14
17
18
19
20
21
22
24
25
28
29
32
33
34
35
36
37
38
39
40
41
42
43
44
45
46
47
48
49
50

7
15
29
19
11
19
11
17
27
21
24

7
26
20
51
27
16
22
25
28
18
29

GEAR SYSTEM FOR DRIVE OF A MULTI-SHAFT EXTRUDER

FIELD OF THE INVENTION

The invention relates to a gear system for the drive of an extruder having several axially parallel shafts.

BACKGROUND OF THE INVENTION

The advantage of multi-shaft extruders with spiral shafts around the rim as compared with a two-shaft extruder is that they have twice as many wedge-shaped regions in which the product is processed particularly effectively when transferred by the conveyor elements from one shaft to the next.

The power of the multi-shaft extruder is critically dependent on the torque provided by the gear system. The maximum power of the gear system is significantly affected by the narrow gap between the shafts. The power of a gear system is expressed by an indicator calculated as the ratio of the torque to the shaft gap in $cm^3$.

EP 0788867 B1 describes a known gear system for a multishaft extruder. The power limit of the gear system of the known multi-shaft extruder is currently around 6 $Nm/cm^3$ per shaft.

The objective of the invention is to significantly increase the power of a gear system for a multi-shaft extruder.

BRIEF SUMMARY OF THE INVENTION

According to the invention, every first and every second pinion is axially offset and is driven both partly from the inside by a central, externally-toothed drive wheel and from the outside by the surrounding internally-toothed hollow gear wheel, with the same torque in each case.

Because of the small gap between them, the driven shafts of the gear system for the multi-shaft extruder must be formed with a correspondingly small diameter. They are therefore loaded to the maximum. Hence a high torque can only be achieved if no transverse or similar forces are acting on the driven shafts. According to the invention, this is ensured by means of the internally-toothed hollow gear wheel, which is driven with the same torque as the externally-toothed drive wheel. The radial forces acting on the pinion thus cancel each other out.

A drive for the central, externally-toothed drive wheel and the surrounding internally-toothed hollow gear wheel with the same power can be implemented in various ways. For example, two separate motors with suitable electronic control can drive the externally-toothed central drive wheel and the internally-toothed hollow gear wheel with the same torque. Another possibility is to provide a differential gear between the main drive shaft of the gear system and the externally-toothed central drive wheel on the one hand, and the surrounding internally-toothed hollow gear wheel on the other, which distributes half of the torque of the main drive shaft to the externally-toothed central main drive wheel and half to the internally-toothed hollow gear wheel.

BRIEF DESCRIPTION OF THE DRAWINGS

An embodiment of the gear system according to the invention is now explained on the basis of the drawing. In the drawing.

DETAILED DESCRIPTION OF THE INVENTION

Figures 1, 2:
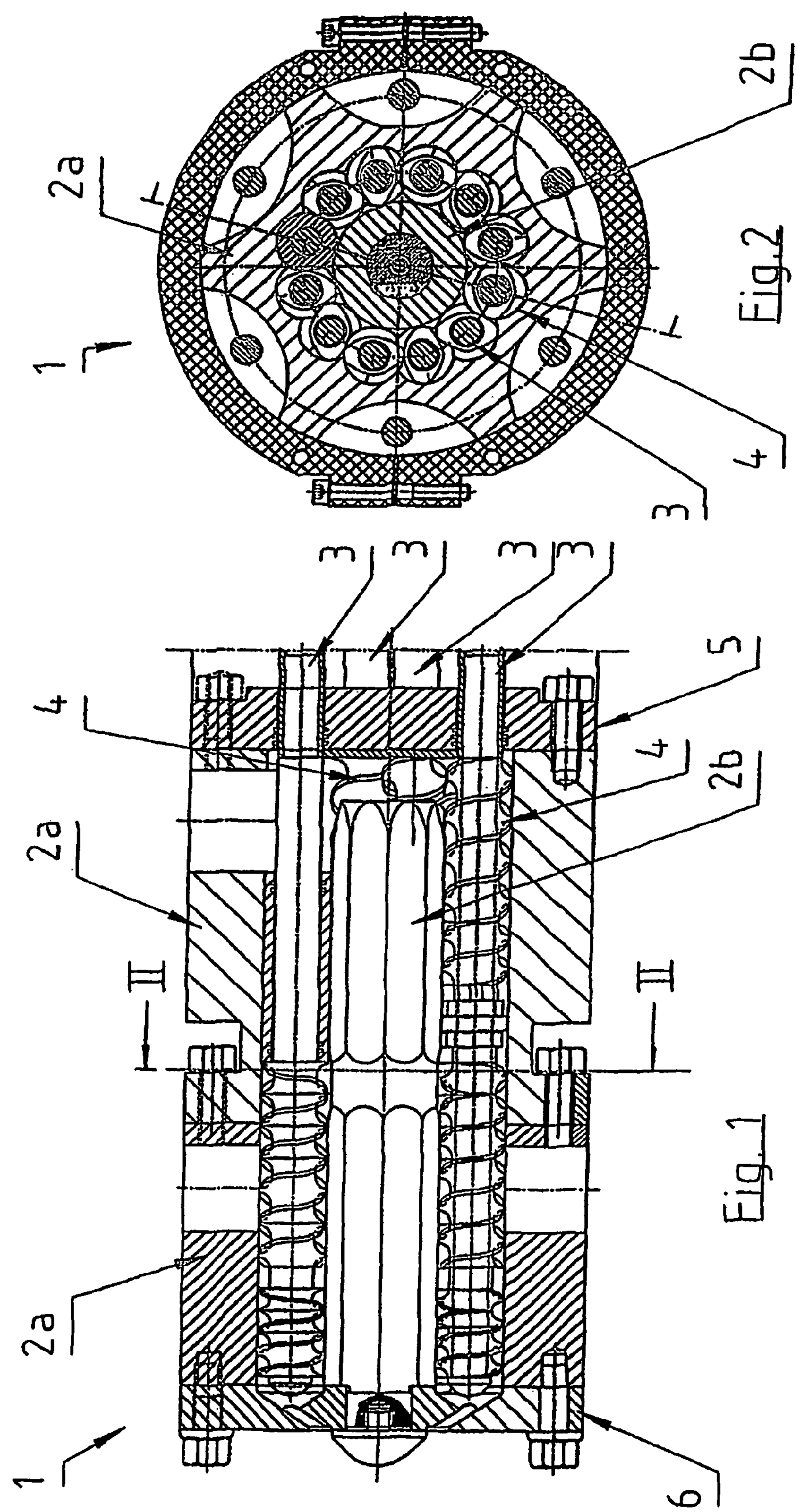
FIG. 1 shows a longitudinal section through the process part of a multi-shaft extruder.
FIG. 2 shows a cross-section along line II-II in FIG. 1.

As shown in FIGS. 1 and 2, the processing part 1 of the extruder, in a housing 2*a* with a core 2*b*, has axially parallel shafts 3, rotating in the same direction, arranged around a circle (FIG. 2) at equal angles with respect to each other, which are equipped with the conveyor elements 4, wherein the conveyor elements 4 of adjacent shafts engage with each other.

The processing part 1 is sealed on its two face ends with end plates 5 and 6. Shafts 3, which are driven in rotation in the same direction by the branching gear system 7 extend through the end plate on the conveyor side.

As shown in FIGS. 3 to 6, the branching gear system is connected via a plate 9 with the end plate 5 of the processing part 1.

Twelve driven shafts 11 extend from the branching gear system 7, on the side facing the processing part 1. These driven shafts 11 are disposed coaxially and are connected in a torque-proof manner with the twelve shafts 3 of the processing part 1. On the side facing away from the processing part 1, the branching gear system 7 is flanged onto the reducer gear system 12 via the connection housing. A main drive shaft 13 extends from the reducer gear system 12 into the connector housing 8. The reducer gear system 12 is driven by a motor, not shown.

Via the coupling and branching bush 40, the main drive shaft 13 drives a drive shaft 14, located coaxially inside it, and four externally located axially parallel drive shafts 15 to 18.

The driven shafts 11 and the pinions 19, 20 are made from a single piece. Because of the small axial gap between the driven shafts 11, the pinions 19, 20 of adjacent driven shafts 11 are axially offset. This means that the pinions 19 are located closer to the processing part 1 than the pinions 20.

Accordingly, the central drive shaft 14 is provided, in a torque-free manner, with two axially offset internally-located externally-toothed drive wheels 21, 22, which engage with the pinions 19, 20.

The pinions 19, 20 are driven by both the central, externally-toothed drive wheels 21, 22 and the surrounding internally-toothed hollow gear wheels 24, 25 arranged radially opposite them, with the hollow gear wheels 24 and 25 also being axially offset accordingly.

Each hollow gear wheel 24, 25 has an outside tooth gearing, which engages with an externally-toothed drive wheel 26 to 29 on the four outwardly-located drive shafts 15 to 18. The outwardly-located drive wheels 26 to 29 are arranged in an axially offset fashion, in the same way as pinions 19, 20, the inwardly-located drive wheels 21, 22 and the hollow gear wheels 24, 25.

Figures 3, 6:
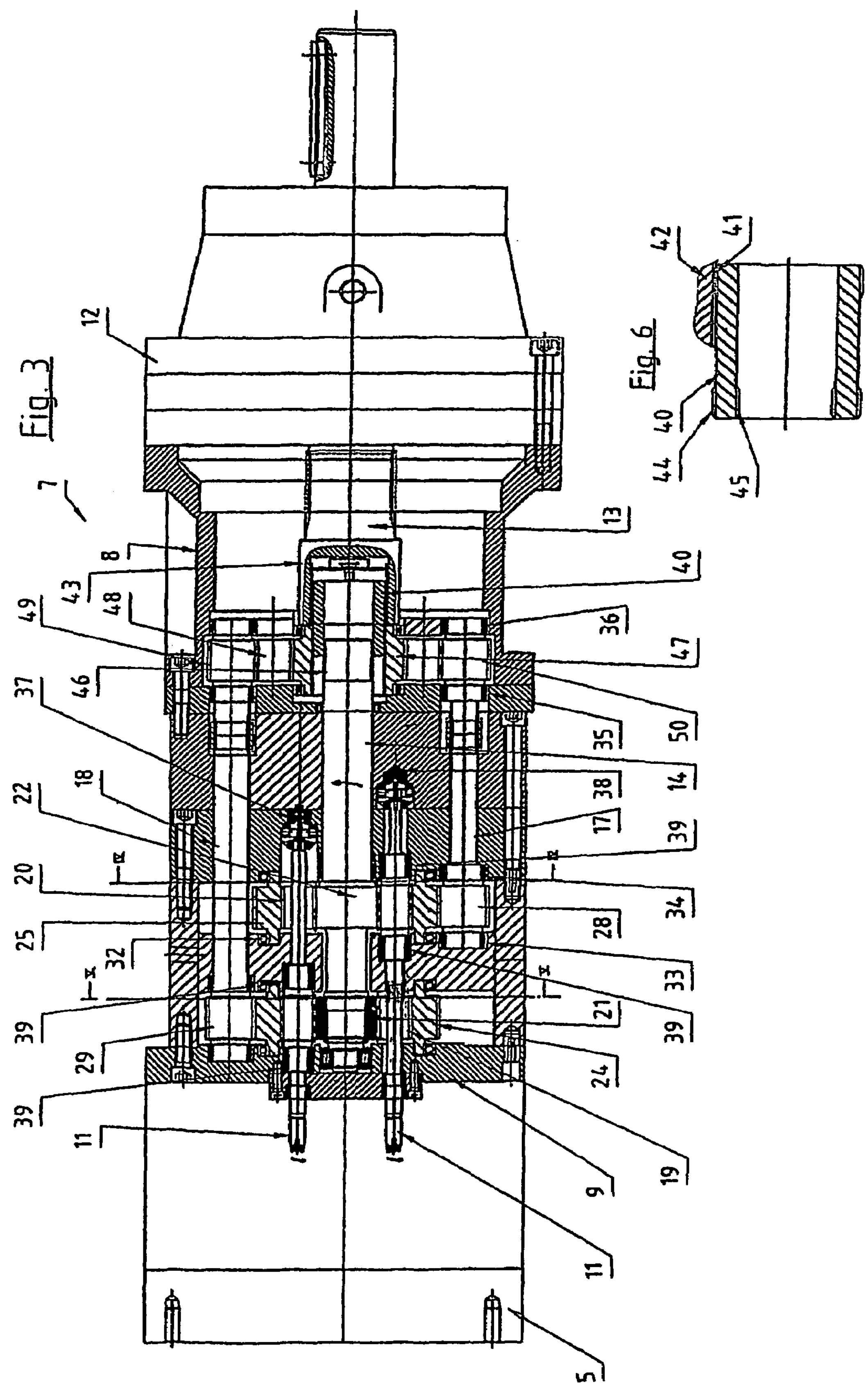
FIG. 3 shows a longitudinal section through the gear system to the drive for the multi-shaft extruder.
FIG. 6 shows an enlarged detailed view of the coupling and branching bush according to FIG. 3.
Figure 5:
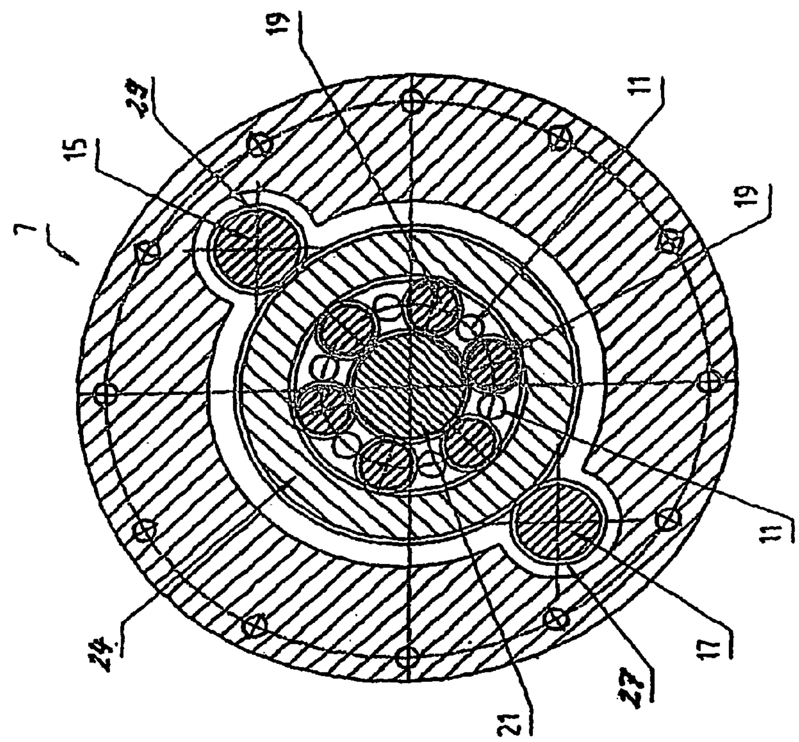
FIG. 5 shows a cross-section taken at lines V-V in FIG. 3.
Figure 4:
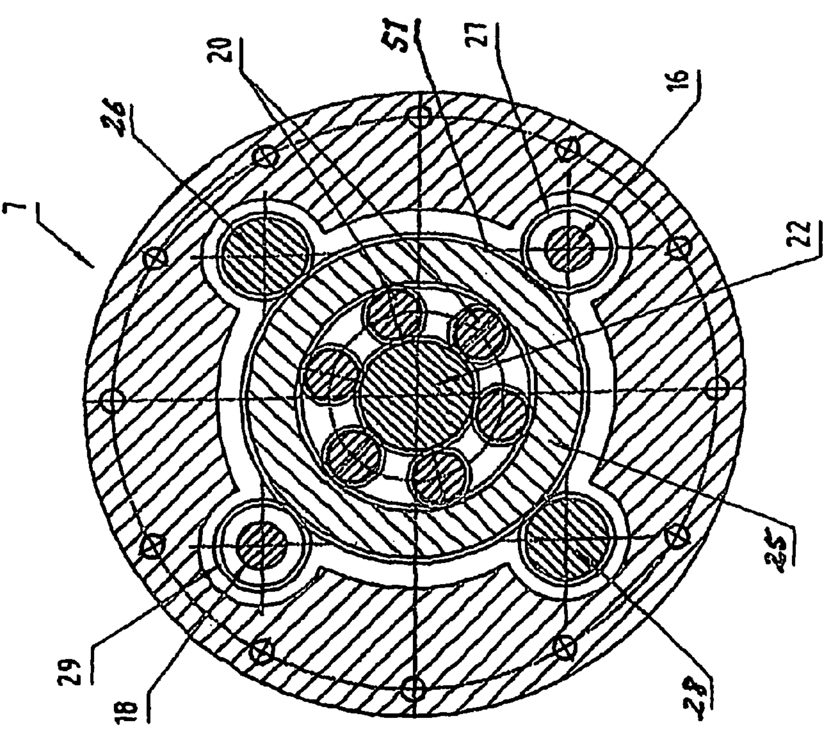
FIG. 4 shows a cross-section taken at lines IV-IV in FIG. 3.

As can be seen from FIGS. 3-5, this arrangement means that the two outwardly-located drive shafts 15, 17 which drive the pinions 19 located nearer the processing part 1 via the hollow gear wheel 24 are longer in form than the two outwardly-located drive shafts 16, 18 that drive the pinions 20. Since the same torque acts on the long and short outwardly-located drive shafts 15, 17 and 16, 18, the long drive shafts 15, 17 would be twisted together to a greater extent than the short drive shafts 16, 18. To equalize the rotary angle, the long drive shafts 15, 17 have a correspondingly larger diameter to ensure the precise distribution of the torque for the hollow gear wheels 24 and 25.

The hollow gear wheels 24, 25 are centered in largely force-neutral fashion by the two diametrically opposed outwardly-located drive wheels 26, 28 and 27, 29. Accordingly, the radial bearings 31, 32 for the hollow gear wheels 24, 25 can be made relatively small. The outwardly-located drive shafts 15 to 18 are supported in the housing with the radial bearings 33, 34 and 35, 36. The driven shafts 11 are supported by the axial bearings 37, 38 and the radial bearings 39.

For power branching purposes a coaxially arranged, floating bush 40 is provided to drive the inwardly-located drive shaft 14 and the outwardly-located drive shafts 15 to 18. As shown in FIG. 6, the floating bush 40 has a straight outer tooth gearing 41, which engages with an inner tooth gearing 42 on the inward side of a sleeve 43 attached in a torque-proof manner to the main drive shaft 13.

In addition, the floating bush 40 has skew bevel gearings 44, 45, opposite each other on the inward and outward side, which engage on the one hand with a skew bevel gearing 46 on the inwardly-located drive shaft 14 and on the other with a skew bevel gearing on the inward side of a hollow gear wheel 47, that is provided with an outside tooth gearing and engages via an interposed reversing wheel 48 with a toothed wheel 49, 50 on the outwardly-located drive shafts 15 to 18.

In place of the gear system shown, with bush 40, hollow gear wheel 47, reversing wheel 48, etc., which distribute the torque of the main drive shaft 13 to the inwardly-located drive shaft 14 and the outwardly-located drive shafts 15 to 18, it is possible to use any other gear system that leads to an optimal distribution of half the power to the inwardly-located drive shaft 14 on the one hand and half to the outwardly-located drive shafts 15 to 18 on the other.

Instead of the two diametrically opposed outer drive wheels 26, 28 and 27, 29, which engage with hollow gear wheel 24 or 25, it is also possible to have three or more outwardly-located drive wheels placed at equal angles with respect to one another and engaging with each hollow gear wheel 24, 25, as a result of which the hollow gear wheels 24, 25 are centered, removing the need for the bearing 31, 32 of the hollow gear wheels 24, 25.

The invention claimed is:

1. Gear system to drive an extruder with several axially parallel shafts, rotating in the same direction, arranged around a circle at equal angles with respect to each other, which are attached in a torque-proof manner to conveyor elements, wherewith the conveyor elements of adjacent said axially parallel shafts engage with each other, wherein driven shafts of the gear system are attached coaxially and in a torque-proof manner to the axially parallel shafts, each said driven shaft having an axially offset driven pinion, the driven pinions engaging respectively with an externally-toothed drive wheel provided on a central drive shaft and with a surrounding internally-toothed hollow gear wheel, wherein the respective drive wheel of the central drive shaft and the hollow gear wheel are arranged in similarly offset fashion, wherein the hollow gear wheel has an external tooth gearing, with which an outwardly located drive wheel on an outwardly-located drive shaft engages, so that half of the torque of each said driven pinion is generated via the central drive wheel and half via the hollow gear wheel.

2. Gear system according to claim 1, wherein the outwardly-located drive shaft comprises one of a plurality of short and long outwardly-located drive shafts having different lengths as a result of the axially offset driven pinions of the adjacent driven shafts, and the short outwardly-located drive shafts have a smaller diameter than the long outwardly-located drive shafts.

3. Gear system according to claim 1, wherein at least two said outwardly-located drive wheels are arranged at equal angles with respect to each other and engage with the external tooth gearing of the hollow gear wheel.

4. Gear system according to claim 1, wherein to drive the central drive shaft and the outwardly-located drive shaft, a coaxial floating bush is provided having an internal tooth gearing and an external tooth gearing, wherein the internal tooth gearing engages with an external tooth gearing on the inwardly-located central drive shaft, and wherein the external tooth gearing engages with an internal tooth gearing of a second hollow gear wheel, and external tooth gearing of the second hollow gear wheel engaging, via an axially offset reversing wheel, with a toothed wheel on the outwardly-located drive shaft.

5. Gear system according to claim 4, wherein the external tooth gearing and the internal tooth gearing of the floating bush are formed by skew bevel gearings opposite each other.

6. Gear system according to claim 4, wherein the bush is driven via a straight tooth gearing.

7. Gear system according to claim 1, wherein the axially parallel shafts comprise at least eight said axially parallel shafts rotating in the same direction.

8. Gear system according to claim 1, wherein the hollow gear wheel comprises a first hollow gear wheel driven by said outwardly located drive shaft, and wherein the outwardly located drive shaft comprises a first outwardly located drive shaft, the system including a second hollow gear wheel spaced axially from the first hollow gear wheel, the second hollow gear wheel being driven by a second outwardly-located drive shaft.

* * * * *